United States Patent
Nakata et al.

(10) Patent No.: US 9,162,217 B2
(45) Date of Patent: Oct. 20, 2015

(54) EXHAUST GAS PURIFYING CATALYST AND CARRIER

(75) Inventors: Shinichi Nakata, Akita (JP); Sumio Kato, Akita (JP); Masataka Ogasawara, Akita (JP); Atsunori Ono, Akita (JP); Yohei Takahashi, Akita (JP); Takashi Wakabayashi, Saitama (JP); Yunosuke Nakahara, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 25 days.

(21) Appl. No.: 14/117,214

(22) PCT Filed: May 17, 2012

(86) PCT No.: PCT/JP2012/062673
§ 371 (c)(1),
(2), (4) Date: Nov. 12, 2013

(87) PCT Pub. No.: WO2012/161091
PCT Pub. Date: Nov. 29, 2012

(65) Prior Publication Data
US 2015/0133292 A1    May 14, 2015

(30) Foreign Application Priority Data

May 20, 2011  (JP) .................................. 2011-113859
Sep. 14, 2011 (JP) .................................. 2011-201035

(51) Int. Cl.
*B01J 23/02*  (2006.01)
*B01J 23/38*  (2006.01)
*B01J 23/58*  (2006.01)
*B01J 27/18*  (2006.01)
*B01D 53/94*  (2006.01)
*B01J 23/42*  (2006.01)
*B01J 23/44*  (2006.01)
*B01J 27/185* (2006.01)
*C01B 25/32*  (2006.01)
*C01B 25/45*  (2006.01)
*F01N 3/10*   (2006.01)
*B01J 37/03*  (2006.01)
*B01J 35/10*  (2006.01)
*B01J 37/02*  (2006.01)

(52) U.S. Cl.
CPC ........... *B01J 27/1806* (2013.01); *B01D 53/945* (2013.01); *B01J 23/42* (2013.01); *B01J 23/44* (2013.01); *B01J 27/1856* (2013.01); *C01B 25/32* (2013.01); *C01B 25/45* (2013.01); *B01D 2255/1021* (2013.01); *B01D 2255/1023* (2013.01); *B01D 2255/1025* (2013.01); *B01D 2255/2042* (2013.01); *B01D 2255/2045* (2013.01); *B01D 2255/9207* (2013.01); *B01J 35/1014* (2013.01); *B01J 37/0201* (2013.01); *B01J 37/031* (2013.01); *F01N 3/101* (2013.01); *Y02T 10/22* (2013.01)

(58) Field of Classification Search
CPC .......... B01J 20/048; B01J 23/02; B01J 23/38; B01J 23/58; B01J 27/1806
USPC .................................. 502/213; 423/308, 312
IPC ................... B01J 20/048, 23/02, 23/38, 23/58, B01J 27/1806
See application file for complete search history.

(56) References Cited

U.S. PATENT DOCUMENTS

| | | | | |
|---|---|---|---|---|
| 7,981,829 B2* | 7/2011 | Wakabayashi et al. | ........ | 502/240 |
| 2012/0165577 A1* | 6/2012 | Fagan et al. | ................ | 568/902.2 |
| 2013/0303363 A1* | 11/2013 | Fagan et al. | .................... | 502/210 |
| 2014/0213439 A1* | 7/2014 | Yamaguchi et al. | .......... | 502/213 |

FOREIGN PATENT DOCUMENTS

| | | | | |
|---|---|---|---|---|
| JP | 06-055075 | * | 3/1994 | ............... B01J 27/14 |
| JP | 07-112121 | | 5/1995 | |
| JP | 09-225306 | | 9/1997 | |
| JP | 11-197507 | * | 7/1999 | ............... B01J 27/18 |
| JP | 2005-075675 | | 3/2005 | |
| JP | 2008-062215 | | 3/2008 | |

OTHER PUBLICATIONS

"Preparation and Characterization of Barium-Strontium Hydroxyapatites," Akemi Yasukawa et al. Journal of Colloid and Interface Science, 191 (1997), pp. 407-415.*
Tomio Ono, "Alkali Dorui Kinzoku Gan' yu Apatite-gata Rinsan' en Tanji Kikinzoku Shokubai no Chosei to NO Kangen Kassei", Shokubai Toronkai Toronkai A Yokoshu, Mar. 18, 2011, 107, p. 44.
International Search Report, PCT/JP2012/062673, Jun. 19, 2012.
Chinese Official Action—201280024422.1—Jun. 8, 2015.
Shigeru Sugiyama et al.—Oxidative Dehydrogenation of Propane on Vanadate Catalysts Supported on Various Metal Hydroxyaptites—Phosphorus Research Bulletin vol. 22 (2008) pp. 13-16.

* cited by examiner

*Primary Examiner* — Patricia L Hailey
(74) *Attorney, Agent, or Firm* — Young & Thompson

(57) ABSTRACT

An apatite compound represented by general formula: $A_{10}(PO_4)_6(OH)_2$ (wherein A represents Ba or a combination of Ba and Sr and/or Ca) is used as a carrier. This exhaust gas purifying catalyst is obtained by having the apatite compound carrier support a noble metal component.

6 Claims, No Drawings

EXHAUST GAS PURIFYING CATALYST AND CARRIER

TECHNICAL FIELD

The present invention relates to an exhaust gas purifying catalyst and to a carrier of the catalyst. More particularly, the invention relates to an exhaust gas purifying catalyst that can effectively remove, at both low and high temperatures, hydrocarbons (THC) and nitrogen oxides ($NO_x$) contained in an exhaust gas discharged from an internal combustion engine, in which a fed fuel is combusted under alternatingly repeating rich and lean fuel conditions, and to a carrier employed in the catalyst.

BACKGROUND ART

Exhaust gas discharged from an internal combustion engine of, for example, an automobile contains toxic components such as hydrocarbons (THC), carbon monoxide (CO), and nitrogen oxides ($NO_x$). Hitherto, three-way catalysts have been used for removing such toxic components for detoxifying the exhaust gas. There have been proposed three-way exhaust gas pulifying catalysts in which a noble metal (e.g., Pt, Pd, or Rh) is supported on a carrier made of alumina, a composite oxide, or a similar material (see, for example, Patent Documents 1 to 4).

PRIOR ART DOCUMENT

Patent Document

Patent Document 1: Japanese Patent Application Laid-Open (kokai) No. H06-055075
Patent Document 2: Japanese Patent Application Laid-Open (kokai) No. H07-112121
Patent Document 3: Japanese Patent Application Laid-Open (kokai) No. H09-225306
Patent Document 4: Japanese Patent Application Laid-Open (kokai) No. H11-197507

SUMMARY OF THE INVENTION

Problems to be Solved by the Invention

However, conventional three-way catalysts exhibit, at high temperature, an interaction with THC, CO, and $NO_x$ contained in an exhaust gas discharged from an internal combustion engine. Therefore, when THC, CO, and $NO_x$ are discharged at a temperature lower than the function-starting temperature of the three-way catalyst employed, these gases cannot be sufficiently removed. Specifically, THC, CO, and $NO_x$ discharged from an automobile or the like cannot be sufficiently removed immediately after engine starting, which is problematic. Thus, there is demand for an exhaust gas purifying catalyst that can clean exhaust gas at lower temperature and that also exhibits sufficient cleaning effect at high temperatures.

Under such circumstances, an object of the present invention is to provide an exhaust gas purifying catalyst that can effectively remove, at both low and high temperatures, THC and $NO_x$ contained in an exhaust gas discharged from an internal combustion engine, in which a fed fuel is combusted under alternatingly repeating rich and lean fuel conditions.

Means for Solving the Problems

In order to attain the aforementioned object, the present inventors have conducted extensive studies, and have found that the object can be attained by use of an apatite compound represented by formula $A_{10}(PO_4)_6(OH)_2$ (wherein A represents Ba or at least one member of Ba, Sr, and Ca) serving as a catalyst carrier, and a noble metal component such as Pd, Pt, or Rh supported on the carrier. The present invention has been accomplished on the basis of this finding.

Accordingly, the exhaust gas purifying catalyst of the present invention is characterized by comprising an apatite compound represented by formula $A_{10}(PO_4)_6(OH)_2$ (wherein A represents Ba or at least one member of Ba, Sr, and Ca) serving as a catalyst carrier, and a noble metal component supported on the carrier.

The catalyst carrier for use in the exhaust gas purifying catalyst is characterized by being formed of an apatite compound represented by formula $A_{10}(PO_4)_6(OH)_2$ (wherein A represents Ba or at least one member of Ba, Sr, and Ca).

Effects of the Invention

The exhaust gas purifying catalyst employing the catalyst carrier of the present invention can effectively remove, at both low and high temperatures, THC and $NO_x$ contained in an exhaust gas discharged from an internal combustion engine, in which a fed fuel is combusted under alternatingly repeating rich and lean fuel conditions. Thus, when the catalyst is brought into contact with an exhaust gas discharged from an internal combustion engine, the exhaust gas can be effectively cleaned.

MODES FOR CARRYING OUT THE INVENTION

Embodiments of the present invention will next be described in detail.

The catalyst carrier of the present invention for use in an exhaust gas purifying catalyst is formed of an apatite compound represented by formula $A_{10}(PO_4)_6(OH)_2$ (wherein A represents Ba or at least one member of Ba, Sr, and Ca). The exhaust gas purifying catalyst of the present invention is formed of an apatite compound represented by formula $A_{10}(PO_4)_6(OH)_2$ (wherein A represents Ba or at least one member of Ba, Sr, and Ca) serving as a catalyst carrier, and a noble metal component such as Pd, Pt, or Rh supported on the carrier. The exhaust gas purifying catalyst of the present invention can effectively remove, at low temperatures, THC and $NO_x$ contained in an exhaust gas discharged from an internal combustion engine, in which a fed fuel is combusted under alternatingly repeating rich and lean fuel conditions, since a satisfactorily high catalytic activity is maintained with respect to an exhaust gas at relatively low temperature which gas is discharged from an automobile or the like immediately after engine starting. Thus, the exhaust gas purifying catalyst of the present invention is suitably employed for cleaning an exhaust gas discharged from an internal combustion engine of an automobile or the like.

In the exhaust gas purifying catalyst of the present invention, the amount of the supported noble metal (e.g., Pd, Pt, or Rh) is preferably about 0.1 to about 5 mass %, with respect to the mass of the apatite compound. When the amount of the supported noble metal (e.g., Pd, Pt, or Rh) is less than 0.1 mass %, cleaning performance tends to be poor, whereas when the amount of the supported noble metal (e.g., Pd, Pt, or Rh) is in excess of 5 mass %, an increase in cleaning performance commensurate with the increase in amount cannot be attained, possibly elevating cost.

Next, an embodiment of the method of producing the apatite compound serving as the catalyst carrier of the present invention will be described. First, an aqueous solution of an Sr compound, that of an aqueous Ba compound, or that of an aqueous Ca compound (which is called aqueous solution A) is prepared. The Sr compound, the Ba compound, or the Ca compound may be an acetate salt thereof. When Sr acetate or Ba acetate is used, the salt is preferably dissolved in an acid such as nitric acid. Separately, a phosphoric acid compound is dissolved in water, to thereby prepare aqueous solution B. Examples of the phosphoric acid compound which may be employed in the invention include potassium dihydrogenphosphate and sodium dihydrogenphosphate. Then, the aqueous solution A and an aqueous alkaline solution are simultaneously and gradually added to the aqueous solution B, whereby precipitates are formed while the pH of the solution mixture is maintained at an alkaline value. The pH of the solution mixture is preferably 12 to 13. As the aqueous alkaline solution added dropwise to solution B, an aqueous solution of sodium hydroxide, potassium hydroxide, etc. may be used at a concentration of about 1 to about 2 mol/L. The thus-formed precipitates are aged at 40 to 90° C. for about 12 to about 24 hours and washed with water. The mixture is filtered, and the separated solid is dried at 100 to 120° C., to thereby yield an apatite compound precursor. The apatite compound precursor is fired at 600 to 1,000° C. for about 3 to about 12 hours, to thereby yield an apatite compound of interest. The compositional proportions of the apatite compound may be slightly deviated from the stoichiometric values, since such an apatite compound having deviated compositional proportions also exhibits the target effect of the present invention. The present invention also encompasses such an apatite compound having slightly deviated compositional proportions.

In one embodiment of the method of producing the exhaust gas purifying catalyst of the present invention, a powder or a slurry of an apatite compound (for example, the apatite compound produced through the aforementioned procedure) is immersed in a solution containing a noble metal component (basic or acidic solution of a noble metal salt), or mixed with a solution containing a noble metal component, whereby the noble metal component is adsorbed on the apatite compound. The thus-obtained liquid is vaporized by heating to dryness, and the residue is fired, to thereby yield a catalyst falling within the scope of the present invention.

The exhaust gas purifying catalyst of the present invention may be used as a combination of the aforementioned apatite compound and the noble metal component (e.g., Pd or Pt). Alternatively, the exhaust gas purifying catalyst of the present invention may be supported on a filter base. In the latter case, a binder component such as $SiO_2$, $TiO_2$, $ZrO_2$, or $Al_2O_3$ is preferably used.

The aforementioned filter base may have any known form, but a 3-dimensional structure is preferred. Specific examples of the form of filters having a 3-dimensional structure include wall-through, flow-through honeycomb, wire mesh, ceramic fiber, porous metal, particle-filled, and foam. Examples of the material of the filter base include ceramic materials such as cordierite and SiC, and alloys such as Fe—Cr—Al alloy and stainless alloy.

In one procedure of depositing the exhaust gas purifying catalyst of the present invention on such a base, a slurry of the exhaust gas purifying catalyst of the present invention is applied onto the base, and the thus-coated base is fired. Alternatively, a slurry of the apatite compound is applied onto the base, to thereby form an apatite compound layer, and the thus-coated base is immersed in a solution containing a noble metal component, to thereby adsorb the noble metal component on the apatite compound layer, followed by firing.

EXAMPLES

The present invention will next be described in detail by way of examples.

Referential Example 1

Calcium acetate was weighed so as to attain the target compositional ratio and dissolved in pure water, to thereby prepare clear aqueous solution A. Similarly, potassium dihydrogenphosphate was weighed so as to attain the target compositional ratio and dissolved in pure water, to thereby prepare clear aqueous solution B. To the clear aqueous solution B, the aforementioned clear aqueous solution A and 1-mol/L aqueous potassium hydroxide were simultaneously added dropwise. During the precipitation operation, the pH of the aqueous medium was maintained at 8 to 14. The thus-precipitated matter was aged at 90° C. for 24 hours and washed with water. The solid-liquid mixture was filtered, and the separated solid was dried at 100° C., to thereby yield a precursor. The precursor was fired at 600° C. for 3 hours, to thereby yield $Ca_{10}(PO_4)_6(OH)_2$, which is an apatite compound of interest. Subsequently, the apatite compound was impregnated with Pd nitrate solution so that the amount of Pd with respect to $Ca_{10}(PO_4)_6(OH)_2$ was adjusted to 1 mass %, and the mixture was evaporated to dryness. The thus-obtained solid was fired at 600° C. for 3 hours, to thereby produce an exhaust gas purifying catalyst formed of 1 mass % $Pd/Ca_{10}(PO_4)_6(OH)_2$. The exhaust gas purifying catalyst (powder) was found to have a BET specific surface area of 31 $m^2/g$.

Referential Example 2

Strontium acetate was weighed so as to attain the target compositional ratio and dissolved in pure water, and 1-mol/L nitric acid was added thereto, to thereby prepare clear aqueous solution C. Similarly, potassium dihydrogenphosphate was weighed so as to attain the target compositional ratio and dissolved in pure water, to thereby prepare clear aqueous solution B. To the clear aqueous solution B, the aforementioned clear aqueous solution C and 1-mol/L aqueous potassium hydroxide were simultaneously added dropwise. During the precipitation operation, the pH of the aqueous medium was maintained at 12 to 13. The thus-precipitated matter was aged at 90° C. for 24 hours and washed with water. The solid-liquid mixture was filtered, and the separated solid was dried at 100° C., to thereby yield a precursor. The precursor was fired at 600° C. for 3 hours, to thereby yield $Sr_{10}(PO_4)_6(OH)_2$, which is an apatite compound of interest. Subsequently, the apatite compound was impregnated with Pd nitrate solution so that the amount of Pd with respect to $Sr_{10}(PO_4)_6(OH)_2$ was adjusted to 1 mass %, and the mixture was evaporated to dryness. The solid was fired at 600° C. for 3 hours, to thereby produce an exhaust gas purifying catalyst formed of 1 mass % $Pd/Sr_{10}(PO_4)_6(OH)_2$. The exhaust gas purifying catalyst (powder) was found to have a BET specific surface area of 37 $m^2/g$.

Example 1

Barium acetate was weighed so as to attain the target compositional ratio and dissolved in pure water, and 4-mol/L nitric acid was added thereto, to thereby prepare clear aqueous solution D. Similarly, sodium dihydrogenphosphate was weighed so as to attain the target compositional ratio and dissolved in pure water, to thereby prepare clear aqueous solution E. To the clear aqueous solution E, the aforementioned clear aqueous solution D and 2-mol/L aqueous sodium hydroxide were simultaneously added dropwise. During the precipitation operation, the pH of the aqueous medium was maintained at 12 to 13. The thus-precipitated matter was aged at 90° C. for 24 hours and washed with water. The solid-liquid mixture was filtered, and the separated solid was dried at 100° C., to thereby yield a precursor. The precursor was fired at 600° C. for 3 hours, to thereby yield $Ba_{10}(PO_4)_6(OH)_2$, which is an apatite compound of interest. Subsequently, the apatite compound was impregnated with Pd nitrate solution so that the amount of Pd with respect to $Ba_{10}(PO_4)_6(OH)_2$ was adjusted to 1 mass, and the mixture was evaporated to dryness. The solid was fired at 600° C. for 3 hours, to thereby produce an exhaust gas purifying catalyst formed of 1 mass % $Pd/Ba_{10}(PO_4)_6(OH)_2$. The exhaust gas purifying catalyst (powder) was found to have a BET specific surface area of 34 $m^2/g$.

Referential Example 3

$Ca_{10}(PO_4)_6(OH)_2$, produced through the same treatment as employed in Referential Example 1, was impregnated with dinitrodiamineplatinum solution so that the amount of Pt with respect to $Ca_{10}(PO_4)_6(OH)_2$ was adjusted to 1 mass %, and the mixture was evaporated to dryness. The solid was fired at 600° C. for 3 hours, to thereby produce an exhaust gas purifying catalyst formed of 1 mass % $Pt/Ca_{10}(PO_4)_6(OH)_2$. The exhaust gas purifying catalyst (powder) was found to have a BET specific surface area of 30 $m^2/g$.

Referential Example 4

$Sr_{10}(PO_4)_6(OH)_2$, produced through the same treatment as employed in Referential Example 2, was impregnated with dinitrodiamineplatinum solution so that the amount of Pt with respect to $Sr_{10}(PO_4)_6(OH)_2$ was adjusted to 1 mass %, and the mixture was evaporated to dryness. The solid was fired at 600° C. for 3 hours, to thereby produce an exhaust gas purifying catalyst formed of 1 mass % $Pt/Sr_{10}(PO_4)_6(OH)_2$. The exhaust gas purifying catalyst (powder) was found to have a BET specific surface area of 37 $m^2/g$.

Example 2

$Ba_{10}(PO_4)_6(OH)_2$, produced through the same treatment as employed in Example 1, was impregnated with dinitrodiamineplatinum solution so that the amount of Pt with respect to $Ba_{10}(PO_4)_6(OH)_2$ was adjusted to 1 mass %, and the mixture was evaporated to dryness. The solid was fired at 600° C. for 3 hours, to thereby produce an exhaust gas purifying catalyst formed of 1 mass % $Pt/Ba_{10}(PO_4)_6(OH)_2$. The exhaust gas purifying catalyst (powder) was found to have a BET specific surface area of 33 $m^2/g$.

Example 3

Strontium acetate and barium acetate were weighed so as to attain the target compositional ratios and dissolved in pure water, to thereby prepare clear aqueous solution F. Then, sodium dihydrogenphosphate was added to the clear aqueous solution F, and the resultant solution became turbid. To the turbid solution, 4-mol/L aqueous sodium hydroxide was added dropwise. During the precipitation operation, the pH of the aqueous medium was maintained at 13. The thus-precipitated matter was aged at 90° C. for 24 hours and washed with water. The solid-liquid mixture was filtered, and the separated solid was dried at 100° C., to thereby yield a precursor. The precursor was fired at 600° C. for 3 hours, to thereby yield $Sr_6Ba_4(PO_4)_6(OH)_2$, which is an apatite compound of interest. Subsequently, the apatite compound was impregnated with dinitrodiamineplatinum solution so that the amount of Pt with respect to $Sr_6Ba_4(PO_4)_6(OH)_2$ was adjusted to 1 mass %, and the mixture was evaporated to dryness. The solid was fired at 600° C. for 3 hours, to thereby produce an exhaust gas purifying catalyst formed of 1 mass % $Pt/Sr_6Ba_4(PO_4)_6(OH)_2$. The exhaust gas purifying catalyst (powder) was found to have a BET specific surface area of 22 $m^2/g$.

Example 4

$Sr_8Ba_2(PO_4)_6(OH)_2$, produced through the same treatment as employed in Example 3, was impregnated with dinitrodiamineplatinum solution so that the amount of Pt with respect to $Sr_8Ba_2(PO_4)_6(OH)_2$ was adjusted to 1 mass %, and the mixture was evaporated to dryness. The solid was fired at 600° C. for 3 hours, to thereby produce an exhaust gas purifying catalyst formed of 1 mass % $Pt/Sr_8Ba_2(PO_4)_6(OH)_2$. The exhaust gas purifying catalyst (powder) was found to have a BET specific surface area of 30 $m^2/g$.

<Exhaust Gas Cleaning Performance Test>

Each of the exhaust gas purifying catalysts produced in Referential Examples 1 to 4 and Examples 1 to 4 was sieved, and particles having a size corresponding to 20 mesh to 60 mesh were recovered as a sample. The sample (0.1 g) was charged into a fixed bed flow reactor and maintained in a 0.5% $O_2$—He atmosphere at 600° C. for 10 minutes. Then, while the temperature of the reactor was lowered, a model gas having a gas composition shown in Table 1 was caused to pass through the catalyst sample at 0.5 L/min, whereby the exhaust gas cleaning performance of the catalyst sample in a temperature range of 200 to 600° C. was evaluated. Tables 2 and 3 show the results.

TABLE 1

| Model gas composition | | | |
|---|---|---|---|
| $C_3H_6$ | NO | $O_2$ | He |
| 1,500 ppm | 1,000 ppm | 9,000 ppm | balance |

TABLE 2

| Percent $C_3H_6$ conversion (%) | | | | | | | | |
|---|---|---|---|---|---|---|---|---|
| Temp. of measuring (° C.) | Ref. Ex. 1 | Ref. Ex. 2 | Ex. 1 | Ref. Ex. 3 | Ref. Ex. 4 | Ex. 2 | Ex. 3 | Ex. 4 |
| 200 | 0 | 0 | 0 | 0 | 0 | 0 | 0 | 0 |
| 225 | 0 | 0 | 0 | 0 | 0 | 0 | 0 | 0 |
| 250 | 0 | 72.9 | 3.6 | 18.2 | 0 | 0 | 3.3 | 0.2 |
| 275 | 2.6 | 92.0 | 77.9 | 20.4 | 2.8 | 0 | 88.2 | 4.5 |
| 300 | 12.6 | 97.0 | 83.0 | 4.9 | 60.5 | 6.6 | 99.9 | 93.4 |
| 325 | 41.5 | 98.6 | 85.2 | 9.2 | 80.0 | 80.4 | 100 | 97.3 |
| 350 | 59.4 | 99.3 | 87.7 | 15.2 | 89.1 | 97.3 | 100 | 98.9 |
| 400 | 84.2 | 99.8 | 88.1 | 42.2 | 97.7 | 99.8 | 100 | 100 |
| 450 | 93.8 | 100 | 85.9 | 73.1 | 99.6 | 99.9 | 100 | 100 |
| 500 | 97.9 | 100 | 83.0 | 87.3 | 99.9 | 99.9 | 100 | 100 |
| 550 | 99.3 | 100 | 87.3 | 91.6 | 99.9 | 99.9 | 100 | 100 |
| 600 | 99.7 | 100 | 92.7 | 94.6 | 100 | 100 | 100 | 100 |

TABLE 3

Percent NO conversion (%)

| Temp. of measuring (° C.) | Ref. Ex. 1 | Ref. Ex. 2 | Ex. 1 | Ref. Ex. 3 | Ref. Ex. 4 | Ex. 2 | Ex. 3 | Ex. 4 |
| --- | --- | --- | --- | --- | --- | --- | --- | --- |
| 200 | 4.1 | 2.9 | 2.7 | 2.7 | 2.0 | 2.2 | 6.2 | 2.4 |
| 225 | 4.6 | 2.6 | 2.4 | 2.4 | 2.0 | 2.7 | 6.5 | 3.0 |
| 250 | 3.6 | 36.1 | 4.1 | 3.9 | 3.6 | 2.9 | 7.0 | 4.1 |
| 275 | 3.8 | 37.2 | 35.8 | 2.8 | 6.5 | 3.6 | 50.6 | 7.3 |
| 300 | 16.7 | 30.8 | 28.5 | 3.2 | 43.0 | 8.1 | 45.0 | 47.0 |
| 325 | 9.8 | 24.1 | 24.9 | 4.9 | 42.5 | 37.8 | 40.7 | 41.7 |
| 350 | 9.5 | 19.4 | 16.4 | 8.8 | 41.4 | 36.6 | 36.5 | 39.2 |
| 400 | 9.7 | 12.3 | 8.7 | 15.7 | 35.0 | 25.1 | 27.7 | 33.2 |
| 450 | 8.3 | 8.1 | 6.6 | 17.1 | 35.2 | 15.9 | 20.3 | 26.5 |
| 500 | 7.7 | 6.2 | 7.7 | 17.1 | 29.4 | 11.2 | 14.6 | 22.5 |
| 550 | 5.8 | 4.7 | 5.3 | 15.4 | 26.3 | 7.8 | 11.7 | 17.9 |
| 600 | 4.6 | 3.2 | 5.2 | 8.6 | 24.2 | 6.9 | 13.2 | 14.2 |

As is clear from Tables 2 and 3, when the Pd-containing exhaust gas purifying catalyst of Referential Example 2 was used, percent $C_3H_6$ conversion and percent NO conversion were high at low temperatures of about ≤300° C. and satisfactory at high temperatures. As compared with the Pd-containing exhaust gas purifying catalyst of Referential Example 2, the Pt-containing exhaust gas purifying catalyst of Referential Example 4 provided high percent NO conversion values at 300° C. or higher, although NO activity lower than 300° C. was unsatisfactory.

As compared with the catalysts of Referential Examples 1 and 2, having a catalyst carrier formed of a Ca-containing or a Sr-containing apatite compound, the catalyst of Example 1, containing Pd supported on a carrier formed of a Ba-containing apatite compound, provided a percent $C_3H_6$ conversion of 80% or higher, and a percent NO conversion of 5% or higher, at 300° C. or higher, which are more excellent than those provided by the catalysts of Referential Examples 1 and 2. As compared with the catalysts of Referential Examples 3 and 4, having a catalyst carrier formed of a Ca-containing or a Sr-containing apatite compound, the catalyst of Example 2, containing Pt supported on a carrier formed of a Ba-containing apatite compound, provided high percent $C_3H_6$ conversion at 325° C. or higher.

As compared with the exhaust gas purifying catalysts of Referential Example 2 and Example 1, containing Pd supported on a carrier formed of an Sr-containing or a Ba-containing apatite compound, the exhaust gas purifying catalysts of Referential Example 4 and Example 2, containing Pt supported on a carrier formed of an Sr-containing or a Ba-containing apatite compound, provided lower percent $C_3H_6$ conversion at about 300° C. or lower. However, the exhaust gas purifying catalysts of Examples 3 and 4 (falling within the scope of the present invention), containing Pt supported on a carrier formed of a Ba- and Si-containing apatite compound, provided improved percent $C_3H_6$ conversion at about 300° C. or lower and enhanced maximum percent NO conversion.

The invention claimed is:

1. An exhaust gas purifying catalyst, comprising
   an apatite compound represented by formula $A_{10}(PO_4)_6(OH)_2$, wherein A represents Ba and at least one of Sr and Ca serving as a catalyst carrier, and
   a noble metal component supported on the carrier.
2. The exhaust gas purifying catalyst according to claim 1, wherein the amount of the supported noble metal is 0.1 to 5 mass %, with respect to the mass of the apatite compound.
3. The exhaust gas purifying catalyst according to claim 1, wherein the apatite compound is at least one of $Sr_6Ba_4(PO_4)_6(OH)_2$ and $Sr_8Ba_2(PO_4)_6(OH)_2$.
4. The exhaust gas purifying catalyst according to claim 3, wherein the supported noble metal is platinum (Pt).
5. The exhaust gas purifying catalyst according to claim 1, wherein the supported noble metal is at least one of Pd, Pt, and Rh.
6. A carrier for use in an exhaust gas purifying catalyst, wherein the carrier is formed of an apatite compound represented by formula $A_{10}(PO_4)_6(OH)_2$, wherein A represents Ba and at least one of Sr and Ca.

* * * * *